Patented June 1, 1926.

1,586,937

UNITED STATES PATENT OFFICE.

KOREO YOSHIZAWA, OF GUMMA-KEN, JAPAN.

PROCESS OF PRODUCING TUBERCULIN.

No Drawing. Application filed May 11, 1925, Serial No. 29,611, and in Japan February 17, 1925.

My invention relates to a novel process of producing a new vaccine-material from tuberculin.

An object of my invention is to provide new means for the vaccine therapy of tuberculosis, whereby the vaccine, for therapeutical purpose, more effective and less toxic, is easily and economically produced.

Another object of my invention is to obtain tuberculin or vaccine which has substantially been deprived of tuberculin reactive constituents or anaphylactic substance usually present in the so-called tuberculin preparations or vaccines and which has a proper and distinctive therapeutical effect on tuberculosis.

A further object of my invention is to produce tuberculin which may be applied to tuberculosis patients more than ten thousand times one dose of the well known tuberculin preparations, without accompanied by the anaphylactic condition due to the injection of tuberculin.

The novel features of my said invention will be pointed out with greater particularity in the appended claims and disclosed in detail in the following description.

There has been used, for therapeutics of tuberculosis, many kinds of tubercle bacilli or tuberculin preparations, but their prophylactic effects have been proved substantially none, and their therapeutical effects also unreliable.

According to my long years researches and experiments, the constituent which produce tuberculin reaction, that is, the toxic substance or anaphylactic substance in the so-called tuberculin preparation, has no beneficial effect on the patient and tuberculous animal when it is applied by means of successive injection, but the effective is contained in the constituent of nontuberculin reaction. I have also found that this effective constituent is not initially present in the bouillon for tubercle bacillus cultivation but can be produced by the growing of tubercle bacillus.

The above effective constituent is present in the cultivation solution of tubercle bacillus or tuberculin, and also in the tubercle bacillus body. That in the tuberculin can not be precipitated by the addition of alcohol, can not be digested by trypsin nor pancreatin, while that in the tubercle bacillus body is present in the constituent of the latter, soluble to alcohol and ether, but not present in the constituent of the same which is soluble to ether but not soluble to alcohol.

My invention has its basis on the above discoveries, and in practising my invention, I cultivate tubercle bacillus in bouillon, sterilize the same, concentrate the same with tuberculin reserved therein, add alcohol thereto, filter it and decant it. I then evaporate the alcohol in the liquid thus taken out, digest the remained liquid until the tuberculin reactive product wholly vanishes, and subject it to a fractional sterilization.

For a more complete understanding of my invention, I describe a practical example thereof as follows:

Tubercle bacilli are cultivated in glycerin-bouillon during about two months and subsequently sterilized at a temperature of about 70° C. The sterilized cultivation is concentrated to nearly one tenth, reserving the tuberculin therein, or in other words, without separating the tuberculin therefrom. Alcohol is then added thereto until it procures 70 to 80 percent part thereof. Twenty-four hours after, the last liquid is filtered and decanted. The clear liquid thus obtained is deprived of alcohol by evaporation and given a weak alkalin nature. Pancreatin is then added thereto and a digestion takes place by 37° C. and continues until the whole tuberculin reactive constituent vanishes. After this step of process, it is subjected to a fractional sterilization at a temperature of about 63° C., in order to demolish the pancreatin. The vanishing of the tuberculin reactive constituent is tested by means of Pirquet's reaction and of Römer's reaction on tuberculous guinea pigs.

The preparation thus obtained is not ready for use before it is cultivated aerobically and anaerobically by a glucose agar during one week or so, and it is ascertained that at the end of this period any bacilli are not grown.

Since my preparation has self-objecting nature to bacilli growing and also has self-sterilizating nature, no foreign bacilli can develop therein.

It is, of course, publicly known that the Rosenbach's tuberculin has the tuberculin reactive constituent demolished in a relatively high degree, but my invention has succeeded to wholly deprive the tuberculin of its tuberculin reactive constituent as well as of its albuminous constituent, and further digest it by pancreatin, thus resulting in a complete vanishing of the tuberculin reactive constituent, and such an art is far more proper and novel beyond the well known processes of this kind, having its basis on quite a special doctrine as previously described.

My tuberculin preparation can be applied to patients in almost every way and purpose wherein the well known tuberculin preparations have heretofore been used. Since it has no tuberculin reactive constituent contained, it may be used in more than ten thousand times of the prior dose, and as it does not accompany the anaphylactic and antianaphylactic condition due to the injection of tuberculin, its therapeutical effect is proper and distinctive on skin tuberculosis, eye tuberculosis, mild or slightly plumonary tuberculosis and any other kind of tuberculosis. Especially as for skin tuberculosis, my preparation can cure the ulcer, lupus nodes completely and radically producing scar.

Though I have described above in respect of a particular process embodying my invention, various modifications and changes can readily be made without departing from the spirit and scope thereof as set forth in the appended claim.

Having now particularly described and ascertained my invention, I declare that what I claim as new and desire to secure by Letters Patent is:—

The herein described process of producing tuberculin, comprising depriving tuberculin preparation of its tuberculin reactive constituent and albumen by adding alcohol thereto, and digesting it by pancreatin.

In testimony whereof I affix my signature.

KOREO YOSHIZAWA.